(12) United States Patent
Farinola

(10) Patent No.: US 6,840,297 B2
(45) Date of Patent: Jan. 11, 2005

(54) HEAVY-DUTY TIRE

(75) Inventor: Luca Farinola, Rome (IT)

(73) Assignee: Bridgestone Corporation, Tokyo (JP)

( * ) Notice: Subject to any disclaimer, the term of this patent is extended or adjusted under 35 U.S.C. 154(b) by 202 days.

(21) Appl. No.: 10/123,670

(22) Filed: Apr. 16, 2002

(65) Prior Publication Data

US 2002/0179215 A1 Dec. 5, 2002

(30) Foreign Application Priority Data

May 31, 2001 (IT) ...................... TO2001A0520

(51) Int. Cl.[7] ................. B60C 15/00; B60C 15/06; B60C 9/00
(52) U.S. Cl. .............. 152/539; 152/542; 152/543; 152/547; 152/555
(58) Field of Search ............... 152/539, 542, 152/543, 547, 555

(56) References Cited

U.S. PATENT DOCUMENTS 4,508,153 A * 4/1985 Tanaka et al. .............. 152/543

FOREIGN PATENT DOCUMENTS

| JP | 03010916 | * | 1/1991 |
| JP | 06156025 | * | 6/1994 |
| JP | 08324214 | * | 12/1996 |

* cited by examiner

*Primary Examiner*—Blaine Copenheaver
*Assistant Examiner*—Justin R Fischer
(74) *Attorney, Agent, or Firm*—Michael Sand; Michael R. Huber

(57) ABSTRACT

A heavy-duty tire, wherein each bead portion (2) is defined by a metal bead bundle (3), about which are turned up a body ply (8), a reinforcing strip (9), and an outer cover layer (10). The outer cover layer is defined by an innerliner (11), an abrasion gum strip (12) which is connected to the innerliner (11) by a splice (14) and is located beneath the innerliner (11), and a sidewall (13). Between the reinforcing strip and the outer cover strip (10), there is inserted a damping strip (21) directly contacting the abrasion gum strip (12) and defined by a mix impermeable to air.

15 Claims, 2 Drawing Sheets

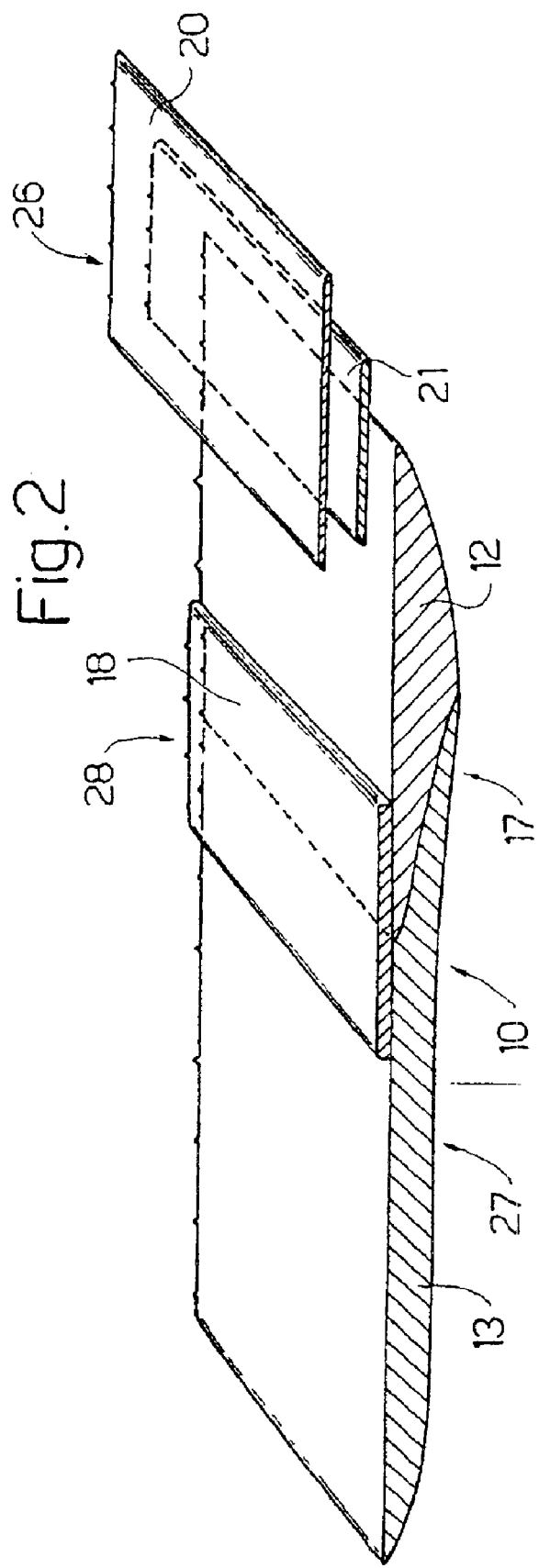

HEAVY-DUTY TIRE

FIELD OF THE INVENTION

The present invention relates to a heavy-duty tire.

BACKGROUND OF THE INVENTION

As is known in the art, heavy-duty or truck and bus (TBR) tires are formed with two annular bead portions, each having a metal bead bundle, and a layered cover turned up about the bead bundle. This layered cover typically includes a body ply, a reinforcing strip formed from an elastomeric material and an outer cover layer. The outer cover layer typically includes an innerliner formed of a material that is substantially impermeable to air, a sidewall and an abrasion gum strip connected to the innerliner by a splice. Tires with innerliner-abrasion gum strip splices are type-indicated IL-O-AGS (innerliner over abrasion gum strip).

In the tire industry, similar tires are produced which only differ from those described above by being AGS-O-IL types. That is, at each innerliner-abrasion gum strip splice, the axially inner lateral annular portion of the abrasion gum strip covers the lateral annular portion of the innerliner. More specifically, the innerliner of AGS-O-IL tires is normally extended laterally so that at each bead portion there is a lateral portion turned up about the bead bundle and interposed between the abrasion gum strip and reinforcing strip.

AGS-O-IL tires are undoubtedly more advantageous in terms of air sealing as the structure of the bead portions substantially prevent air from migrating slowly outwards through the carcass. It should be stated that with the exception of the innerliner, which is normally made from a substantially air impermeable mix such as bromobutyl, all the layers of elastomeric material used in the making of a tire are slightly permeable to air. In known AGS-O-IL tires of the type described i.e. having an innerliner with a lateral portion which is turned up at the bead portions and which is covered by the relative abrasion gum strip the danger of air filtering outwards close to the wheel rim, i.e. through the thickness of the abrasion gum strip not protected by the innerliner, still exists. Experience has shown however, that the air tends to migrate radially outwards through the abrasion gum strip and is immediately arrested by the turned-up portion of the innerliner.

Despite the above advantage, AGS-O-IL tires of the type described are substantially no longer used and have been replaced by corresponding IL-O-AGS tires of the type described above. The reason being that, given the considerable difference in hardness of the abrasion gum strip and innerliner materials, along with the poor "grip" of the innerliner to the surrounding layers, the axially inner part of each abrasion gum strip tends to work loose relatively quickly from the underlying innerliner. This can make the tire unsafe for remolding. This drawback is substantially eliminated in IL-O-AGS tires wherein the axially inner end of each abrasion gum strip is clamped by the innerliner.

In currently produced IL-O-AGS tires, each abrasion gum strip is mounted directly on the underlying reinforcing strip. Though this greatly improves the stability of the abrasion gum strips, such a method involves serious drawbacks with respect to air sealing, as the compressed air migrates through the carcass, and the ability of the tire to withstand on-rim assembly stress.

With respect to the effects of assembly stress on currently produced IL-O-AGS tires, tests have shown that the abrasion gum strips are unable at times to absorb assembly stress and are split locally by the wheel rim flanges. This is especially true when using automatic assembly fixtures because the abrasion gum strips are extremely hard and secured to the underlying reinforcing strips.

SUMMARY OF THE INVENTION

What the art needs is an IL-O-AGS heavy-duty tire designed to eliminate the aforementioned assembly drawback.

According to the present invention, there is provided a heavy-duty tire which includes two annular bead portions each having a metal bead bundle, and a layered cover turned up about the bead bundle. The layered cover includes a body ply, a reinforcing strip formed of an elastomeric material defined by a first mix, and an outer cover layer. The outer cover layer includes an innerliner defined by a second mix impermeable to air, an abrasion gum strip defined by a third mix harder than said second mix, and a sidewall. The abrasion gum strip is connected to the innerliner by a splice wherein a lateral annular portion of the innerliner covers an axially inner lateral annular portion of the abrasion gum strip. Between the reinforcing strip and the outer cover layer, there is inserted a damping strip defined by a fourth mix, softer than said third mix, and directly contacting the abrasion gum strip.

In one embodiment of the IL-O-AGS tire defined above, the damping strip has an axially inner lateral edge located radially outwards of said splice and directly contacting said innerliner.

In the IL-O-AGS tire defined above, the fourth mix is preferably the same as the second mix.

Making the damping strip from a mix impermeable to air therefore provides for simultaneously solving both problems: splitting of the abrasion gum strips when assembling the tires to the relative wheel rims; and poor air sealing typical of known IL-O-AGS tires.

The tire can also include a protection strip contacting the reinforcing strip and being located between the reinforcing strip and the damping strip. The protection strip being made of an elastomeric material, which is preferably defined by said first mix.

BRIEF DESCRIPTION OF THE DRAWINGS

FIG. 2 shows a smaller-scale, partly sectioned view in perspective of a detail of FIG. 1 in the making.

EMBODIMENTS OF THE INVENTION

Figure 1:
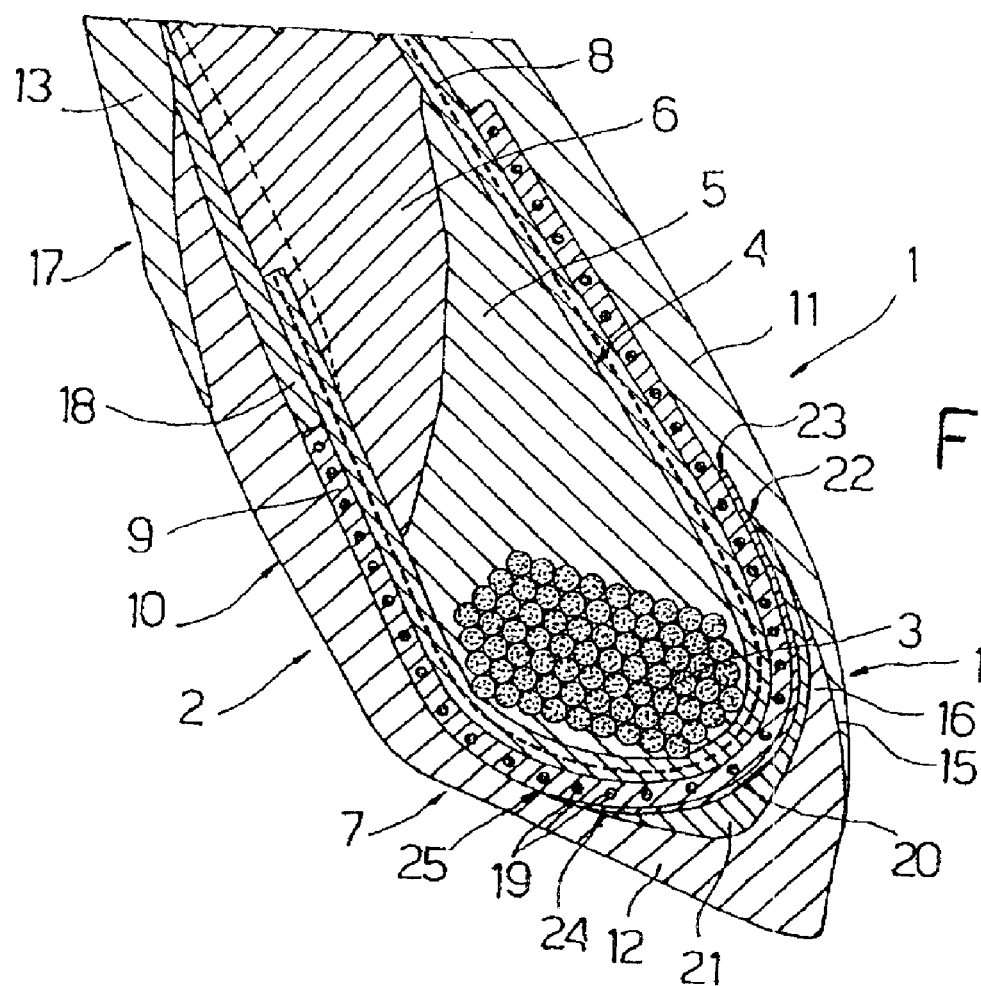
FIG. 1 shows a partial axial section of the tire according to the present invention.

Number 1 in FIG. 1 indicates as a whole a heavy-duty TBR tire having two bead portions 2. Each bead portion 2 includes a metal bead bundle 3 and a substantially triangular-shaped bead filler 4. Bead filler 4 is defined by two radially series annular elements 5 and 6. Each bead portion 2 also includes a layered cover 7 turned up about bead bundle 3. Layered cover 7 includes a body ply 8, a reinforcing strip 9, and an outer cover layer 10. Outer cover layer 10 is formed by an innerliner 11, an abrasion gum strip 12, and a sidewall 13. Abrasion gum strip 12 is connected on one side to innerliner 11 by a splice 14 and on the other side to sidewall 13 by a splice 17. A lateral annular portion 15 of innerliner 11 covers an axially inner lateral annular portion 16 of abrasion gum strip 12 at splice 14. An annular insert 18 formed of elastomeric material is located beneath abrasion gum strip 12 at splice 17 and extends the outer end of reinforcing strip 9 outwards.

In reinforcing strip 9, an inner reinforcing assembly 19 of normally metal wires is embedded in an elastomeric material defined by a first mix softer than a third mix which defines the elastomeric material of abrasion gum strip 12. Innerliner 11 is preferably defined by a second mix which is substantially impermeable to air, such as a bromobutyl mix.

Between reinforcing strip 9 and outer cover layer 10, there are inserted a protection strip 20 formed of an elastomeric material which directly contacts reinforcing strip 9; and a damping strip 21. An axially inner lateral edge 22 of damping strip 21 is located radially outwards of splice 14 and directly contacts the inner surface of innerliner 11. Additionally, axially inner lateral edge 22 is located radially inwards of an axially inner lateral edge 23 of protection strip 20. An axially outer edge 24 of damping strip 21 is located at an intermediate point of reinforcing strip 9 and radially and axially inwards of a corresponding edge 25 of protection strip 20.

Damping strip 21 directly contacts abrasion gum strip 12 and is defined by a fourth mix softer than the third mix defining the elastomeric material of abrasion gum strip 12. More specifically, damping strip 21 is preferably made of the same material as innerliner 11, i.e. bromobutyl; and protection strip 20, which is optional, is preferably made from the same mix as the coating skims of reinforcing strip 9.

With reference to FIG. 2, when making tire 1 as described above, each protection strip 20 and relative damping strip 21 may be coextruded to form a preassembled component 26. This preassembled component 26 is later assembled to a further respective preassembled component 27 defined by relative abrasion gum strip 12, by relative sidewall 13, and possibly by relative insert 18, to obtain a single preassembled component 28.

In an alternative construction variation (not shown), a preassembled component is formed similar to preassembled component 28, but without relative protection strip 20, which is preassembled to relative reinforcing strip 9.

It should be stressed that, in tire 1 as described, damping strip 21, being much softer than relative abrasion gum strip 12, is deformable and can so absorb part of the stress to which abrasion gum strip 12 is subjected, thus preventing damage to abrasion gum strip 12 when fitting tire 1 to the wheel rim. Moreover, as regards air leakage, damping strips 21 made of bromobutyl, and the axially inner lateral edges 22 of damping strips 21 located radially outwards of relative splices 14 and directly contacting the inner surface of innerliner 11, substantially reproduce, in tire 1, the same sealing conditions as corresponding known AGS-O-IL tires with the innerliner turned up about the bead bundles.

It should also be pointed out that the function of protection strip 20 is substantially to protect he relatively soft, easily abradable material of damping strip 21 from too-close contact with inner reinforcing assembly 19 of reinforcing strip 9. Obviously, protection strip 20 may be eliminated; in which case, however, it is advisable to replace the normally used reinforcing strips 9 with others with thicker coating skims.

The invention is not limited to the above embodiments. The claims follow.

What is claimed is:

1. A heavy-duty tire comprising:
   two annular bead portions (2), each having a metal bead bundle (3);
   a layered cover turned up about the bead bundle (3), said layered cover having a body ply (8), a reinforcing strip (9) formed of an elastomeric material defined by a first mix, and an outer cover layer (10);
   said outer cover layer (10) having an innerliner (11) defined by a second mix substantially impermeable to air, an abrasion gum strip (12) defined by a third mix harder than said second mix, and a sidewall (13);
   the abrasion gum strip (12) being connected to the innerliner (11) by a splice (14);
   wherein a lateral annular portion (15) of the innerliner (11) covers an axially inner lateral annular portion (16) of the abrasion gum strip (12); and
   wherein between the reinforcing strip (9) and the outer cover layer (10), there is inserted a damping strip (21) defined by a fourth mix, softer than said third mix and substantially impermeable to air, and directly contacting the abrasion gum strip (12).

2. The tire defined in claim 1, wherein said damping strip (21) has an axially inner lateral edge (22) located radially outwards of said splice (14) and directly contacting said innerliner (11).

3. The tire defined in claim 2 further comprising a protection strip (20) made of elastomeric material and located directly contacting the reinforcing strip (9) and between the reinforcing strip (9) and the damping strip (21).

4. The tire defined in claim 3, wherein said protection strip (20) has an axially inner lateral edge (23) located radially inwards of said axially inner lateral edge (22) of said damping strip (21).

5. The tire defined in claim 3, wherein said protection strip (20) and said damping strip (21) define a preassembled component (26).

6. The tire defined in claim 1, wherein said fourth mix is the same as said second mix.

7. The tire defined in claim 6, wherein said fourth mix is a bromobutyl mix.

8. The tire defined in claim 1, wherein said fourth mix is a bromobutyl mix.

9. The tire defined in claim 1 further comprising a protection strip (20) made of elastomeric material and located directly contacting the reinforcing strip (9) and between the reinforcing strip (9) and the damping strip (21).

10. The tire defined in claim 9, wherein said protection strip (20) is defined by said first mix.

11. The tire defined in claim 9, wherein said protection strip (20) has an axially inner lateral edge (23) located radially inwards of said axially inner lateral edge (22) of said damping strip (21).

12. The tire defined in claim 9, wherein said protection strip (20) and said damping strip (21) defined a preassembled component (26).

13. The tire defined in claim 9, wherein said reinforcing strip (9) and said protection strip (20) define a preassembled component.

14. The tire defined in claim 1, wherein said abrasion gum strip (12), said sidewall (13), and said damping strip (21) define a single preassembled component (28).

15. A heavy-duty tire comprising:
   two annular bead portions (2), each having a metal bead bundle (3);
   a layered cover turned up about the bead bundle (3), said layered cover having a body ply (8), a reinforcing strip (9) formed of an elastomeric material defined by a first mix, and an outer cover layer (10);
   said outer cover layer (10) having an innerliner (11) defined by a second mix substantially impermeable to air, an abrasion gum strip (12) defined by a third mix harder than said second mix, and a sidewall (13);

the abrasion gum strip (12) being connected to the innerliner (11) by a splice (14);

wherein a lateral annular portion (15) of the innerliner (11) covers an axially inner lateral annular portion (16) of the abrasion gum strip (12); wherein between the reinforcing strip (9) and the outer cover layer (10), there is inserted a damping strip (21) defined by a fourth mix, softer than said third mix, and directly contacting the abrasion gum strip (12), said damping strip (21) having an axially inner lateral edge (22) located radially outwards of said splice (14) and directly contacting said innerliner(11); and wherein a protection strip (20) made of elastomeric material is located directly contacting the reinforcing strip (9) and between reinforcing strip (9) and the damping strip (21), said protection strip (20) having an axially inner lateral edge (23) located radially inwards of said axially inner lateral edge (22) of said damping strip (21).

\* \* \* \* \*